United States Patent
Warwel et al.

(10) Patent No.: US 6,641,209 B2
(45) Date of Patent: Nov. 4, 2003

(54) FRONT-HOOD ARRANGEMENT FOR A PASSENGER VEHICLE AND METHOD OF MAKING SAME

(75) Inventors: Juergen Warwel, Gerlingen (DE); Thomas Frank, Stuttgart (DE); Klaus Rathje, Hildrizhausen (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/157,020

(22) Filed: May 30, 2002

(65) Prior Publication Data

US 2002/0195837 A1 Dec. 26, 2002

(30) Foreign Application Priority Data

May 30, 2001 (DE) .......................... 101 26 195

(51) Int. Cl.$^7$ ................................ B60R 27/00
(52) U.S. Cl. ............... 296/189; 296/194; 180/69.2; 180/69.21
(58) Field of Search ................ 296/188, 189, 296/194, 76; 180/69.2, 69.21

(56) References Cited

U.S. PATENT DOCUMENTS 5,115,878 A * 5/1992 Hayata .................. 296/189
5,682,667 A * 11/1997 Flagg .................. 180/69.2
5,706,908 A * 1/1998 Sakai et al. .............. 180/69.2
5,988,305 A * 11/1999 Sakai et al. .............. 296/189

FOREIGN PATENT DOCUMENTS

| DE | 27 11 339 | 9/1978 |
| DE | 198 46 192 | 4/2000 |
| EP | 0 992 418 | 4/2000 |
| JP | 10-258773 | 9/1998 |

* cited by examiner

Primary Examiner—Joseph D. Pape
Assistant Examiner—Lori L Coletta
(74) Attorney, Agent, or Firm—Crowell & Moring LLP

(57) ABSTRACT

A front-hood arrangement, in particular a hood arrangement for a passenger vehicle is provided with a downwardly facing, lateral separating gap between the front hood and a mudguard. The front hood has an internal inner hood and an external outer hood. The front hood has a stiffening zone which is supported directly or indirectly on a supporting element of the vehicle body when the front hood is closed. The outer hood has a lateral border region, the end edge of which is adjacent to the separating gap, at least one connecting web being provided via which the stiffening zone is connected to the border region of the outer hood. In order to improve the expansion behavior when a person impacts vertically onto the front hood, it is proposed that when the front hood is closed, the stiffening zone is supported laterally outwards on stop means which are fastened to the supporting element of the vehicle body.

33 Claims, 3 Drawing Sheets

FRONT-HOOD ARRANGEMENT FOR A PASSENGER VEHICLE AND METHOD OF MAKING SAME

BACKGROUND AND SUMMARY OF THE INVENTION

This application claims the priority of Application No. 101 26 195.0 21, filed May 30, 2001, in Germany, the disclosure of which is expressly incorporated by reference herein.

The invention relates to a front-hood arrangement for a passenger vehicle. Preferred embodiments of the invention relate to a front lid or hood arrangement for a passenger vehicle, having a downwardly facing, lateral separating gap, between the front hood and a mudguard, the front hood having an internal inner hood and an external outer hood, the front hood having at least one stiffening zone which is supported directly or indirectly on a lateral supporting element of a vehicle body when the front hood is closed, the outer hood having a lateral border region, an end edge of which is adjacent to the separating gap, at least one connecting web being provided via which the stiffening zone is connected to the border region of the outer hood.

German Patent Document DE 198 46 192 A1 discloses a front-hood arrangement of the type mentioned above which has a downwardly facing, lateral separating gap between the front hood and the mudguard. In this case, the front hood has an internal inner hood and an external outer hood, an energy-absorbing intermediate layer being arranged between the inner hood and outer hood. In a lateral border region adjacent to the separating gap, the inner hood has a stiffening zone which is supported directly on a lateral supporting element of the vehicle body when the front hood is closed. The outer hood is supported by the inner hood and has a lateral border region, the end edge of which is adjacent to the separating gap. The border region of the inner hood has a connecting web via which the stiffening zone is connected to the border region of the outer hood, namely to its end edge.

By means of this construction of the front-hood arrangement, firstly a relatively high stability of the hood and secondly a relatively easy, energy-absorbing deformation of the hood when a pedestrian impacts against it can be achieved. In this case, the downwardly drawn border regions bring about high supporting stability while the central hood region can be kept relatively flat and in a manner such that it can undergo energy-absorbing deformation. This enables a risk of injury when a pedestrian impacts on it to be reduced.

German Patent Document DE 27 11 339 A1 discloses a further front-hood arrangement for a passenger vehicle, which is likewise concerned with the problem of reducing injuries to pedestrians when they impact against the front hood. For this purpose, the front hood is designed to be flexible in the vertical direction. In this connection, in order to obtain sufficient vertical flexibility, use is made of the effect that any front hood which is curved in cross section has a tendency to expand laterally under vertically acting forces. In order to use this effect to increase the vertical flexibility, it is proposed to remove the lateral end regions of the front hood from the supporting region of the adjacent vehicle-body parts, in order thereby to provide a further deformation path for the hood. In the lateral border region of the front hood, a reinforcing plate which forms an outwardly inclined guide contour is arranged on the inside of the hood. The reinforcing plate and the front hood rest at their lower end on a flexible rubber profile, the upper side of which has an outwardly inclined surface. If, in the case of an accident, a force is exerted on the hood from above, the inclined guide contour of the reinforcing plate can be brought to interact with the oblique surface of the rubber profile, as a result of which the border region of the hood is spread apart and attains an additional deformation path.

The present invention is concerned with the problem of specifying, for a front-hood arrangement of the type mentioned at the beginning, an embodiment in which the expansion of the front hood is improved, in order thus to increase the damping effect when a pedestrian impacts against it.

This problem is solved according to the invention by a front-hood arrangement of the above-mentioned type, wherein when the front hood is closed, the stiffening zone is supported laterally outwards on stop means which are fastened to the supporting element of the vehicle body. In the invention, when the front hood is closed, the stiffening zone is supported laterally outwards on stop means, the stop means being fastened to the supporting element of the vehicle body. This manner of construction gives rise, when a force acts from above, inevitably to a deformation in the border region of the inner hood, as a result of which the border region of the outer hood is inevitably expanded outwards because of the selected coupling between the inner hood and outer hood. All in all, the arrangement according to the invention gives rise to increased safety by the fact that the border regions of the outer hood expand, when a pedestrian impacts against them, with the consequence that an increased deformation and damping path in the vertical direction can be ensured with great reliability.

In one development of certain preferred embodiments of the invention, the at least one connecting web can be connected to the border region of the outer hood at a connection point which is remote from the separating gap, the stop means being arranged on a side of a vertical plane running in the longitudinal direction of the vehicle and through this connection point, which side faces away from the end edge of the border region of the outer hood, the at least one connecting web also having a predetermined breaking point in the region of this connection point. In the case of this manner of construction, the end edge of the outer-hood border region is free, i.e. it does not have a direct connection to the inner hood. This enables the outer hood to expand more easily in its border regions. The selected connection point in conjunction with the predetermined breaking point produces a kinematic arrangement which inevitably causes the outer-hood border regions to expand when a pedestrian impacts against them.

In a particularly advantageous development of certain preferred embodiments of the invention, the border region of the inner hood can have at least one transverse web which extends between two adjacent connecting webs and is fastened by its lower end to the border region of the outer hood in the region of its end edge, and, outside the border region of the outer hood, emerges with its upper end from the inner hood. With the aid of a transverse web of this type, a forced adjustment is achieved for the end edge on the border region of the outer hood, the forced adjustment arising when the front hood is deformed due to a vertical action of force.

In the case of an alternative embodiment, the at least one connecting web can be fastened to the border region of the outer hood, in the region of its end edge, the at least one connecting web between the stiffening zone and the end edge being of longer design than a straight connecting line running through the stiffening zone and the end edge. This manner of construction enables the particular connecting web to be drawn out when the outer hood expands, this drawing-out process forcing a downwardly directed movement on the expansion movement of the outer hood. This enables a risk of injury to be reduced in the region of the expanding outer hood.

Further important features and advantages of the invention are set forth herein in the claims and the drawings and in the associated description of figures referring to the drawings.

It should be understood that the features mentioned above and those which have yet to be explained below can be used not only in the respectively specified combination, but also in other combinations or on their own without departing from the scope of the present invention.

Preferred exemplary embodiments of the invention are illustrated in the drawings and will be explained in greater detail in the following description.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
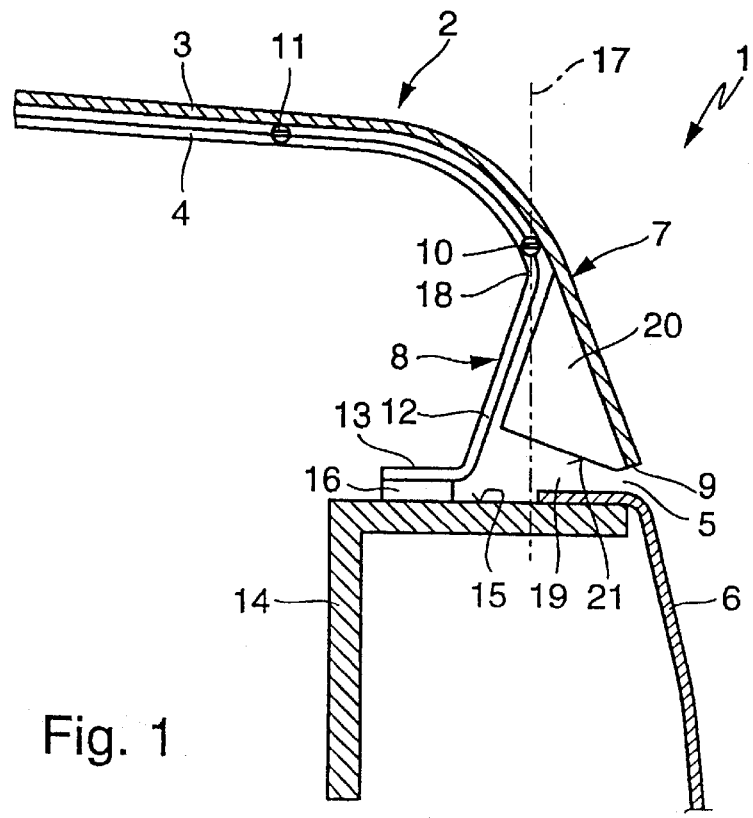
FIG. 1 is a sectional view of a lateral border region of a front-hood arrangement according to the invention in a first embodiment.

According to FIGS. 1 to 6, in the case of a front-hood arrangement 1 according to the invention, a front hood 2 has an exterior outer hood 3 and an interior inner hood 4. The front hood 2 is usually a bonnet or hood of a passenger vehicle; passenger vehicles are also known in which the front hood 2 is used as a boot or trunk hood. In the case of this front-hood arrangement 1, the front hood 2 is designed in such a manner that a separating gap 5 between the front hood 2 and a mudguard 6 faces laterally downwards. Accordingly, the outer hood 3 and the inner hood 4 each have a lateral border region 7 and 8, respectively. The border region 7 of the outer hood 3 has an end edge 9 which is adjacent to the separating gap 5. The outer hood 3 is supported by the inner hood 4, in which case, according to FIGS. 1 and 2, suitable connection points 10 and 11 can be realized, for example, by means of adhesive connections.

In the case of the embodiments of FIGS. 1 to 4, the border region 8 of the inner hood 4 has at least one connecting web 12 which merges into a stiffening zone 13 of the border region 8 of the inner hood 4. The stiffening zone 13 is connected to the border region 7 of the outer hood 3 via this connecting web 12.

In the region of the front-hood arrangement 1, the passenger vehicle, which is otherwise not illustrated, has on each side a lateral supporting element 14 which forms a part of the vehicle body and is formed, for example, by an upper frame side rail to which the mudguard 6 is also attached. Fastened to this supporting element 14, on an upper side 15 which faces the front hood 2, are stop means 16 on which the stiffening zone 13 is supported laterally at least outwards, in particular in a form-fitting manner, when the front hood 2 is closed.

Figure 2:
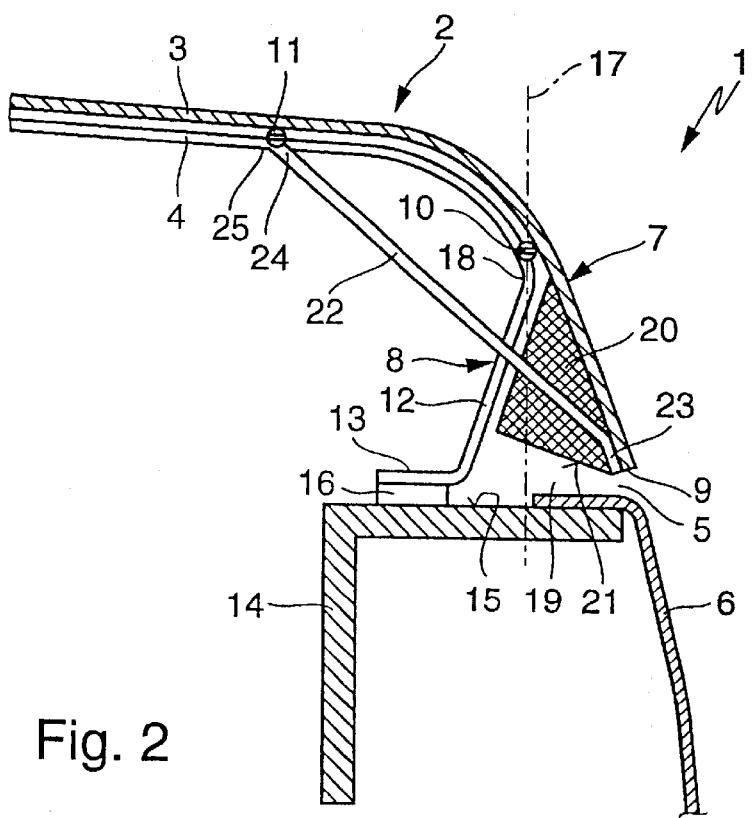
FIG. 2 is a sectional view similar to FIG. 1, but showing a second embodiment.

According to the embodiments of FIGS. 1 and 2, the connecting web 12 is connected to the border region 7 of the outer hood 3 at a point which is remote from the separating gap 5, in this case at the connection point 10, as a result of which the end edge 9 of this border region 7 is arranged in a relatively unbound and free manner on the separating gap 5. An imaginary vertical plane 17 is drawn in on FIGS. 1 and 2, the plane extending in the longitudinal direction of the vehicle, i.e. perpendicularly with respect to the plane of projection, and running through the connection point 10. With regard to this vertical plane 17, the stop means 16 are arranged on a different side than the end edge 9 of the outer hood 3. In addition, the stop means 16 are arranged at a distance from this vertical plane 17, as a result of which the connecting web 12 is inclined with respect to this vertical plane 17. Otherwise, this connecting web 12 extends essentially rectilinearly between the connection point 10 and the stiffening zone 13. In the region of the connection point 10, the connecting web 12 has a predetermined breaking point 18.

Below the connection point 10, a cavity 19 is formed between the border region 7 of the outer hood 3 and the border region 8 of the inner hood 4, the cavity being filled here for the most part by a filling element 20. This filling element 20 consists of an energy-absorbing material and can have a sliding flank 21 on its lower side.

In principle, a single connecting web 12 can be provided which extends over the entire longitudinal extent of the inner hood 4. However, in order to reduce the rigidity of the inner hood 4, an embodiment is preferred in which a plurality of connecting webs 12 which are spaced apart from one another in the longitudinal direction of the vehicle are provided. According to FIG. 2, at least one transverse web 22 can be arranged between two adjacent connecting webs 12 and is fastened by a lower end 23 to the border region 7 of the outer hood 3, in the region of the end edge 9. Outside the border region 7 of the outer hood 3, this transverse web 22 emerges with its upper end 24 from the inner hood 4. According to FIG. 2, this transverse web 22 can be angled away from the inner hood 4. An embodiment is also contemplated in which the transverse web 22 is designed as a separate component and is fastened to the inner hood 4. The inner hood 4 is expediently connected to the outer hood 3 in the region of the upper end 24 of the transverse web 22; accordingly, the connection point 11 is situated here at the upper end 24 of the transverse web 22.

In the case of the preferred embodiment shown here, the transverse web 22 is configured in such a manner that it extends essentially rectilinearly between its ends 23 and 24. Furthermore, a predetermined breaking point 25 is formed in the region of the upper end 24, which point also forms a transition between the upper end 24 and the inner hood 4.

Figure 3:
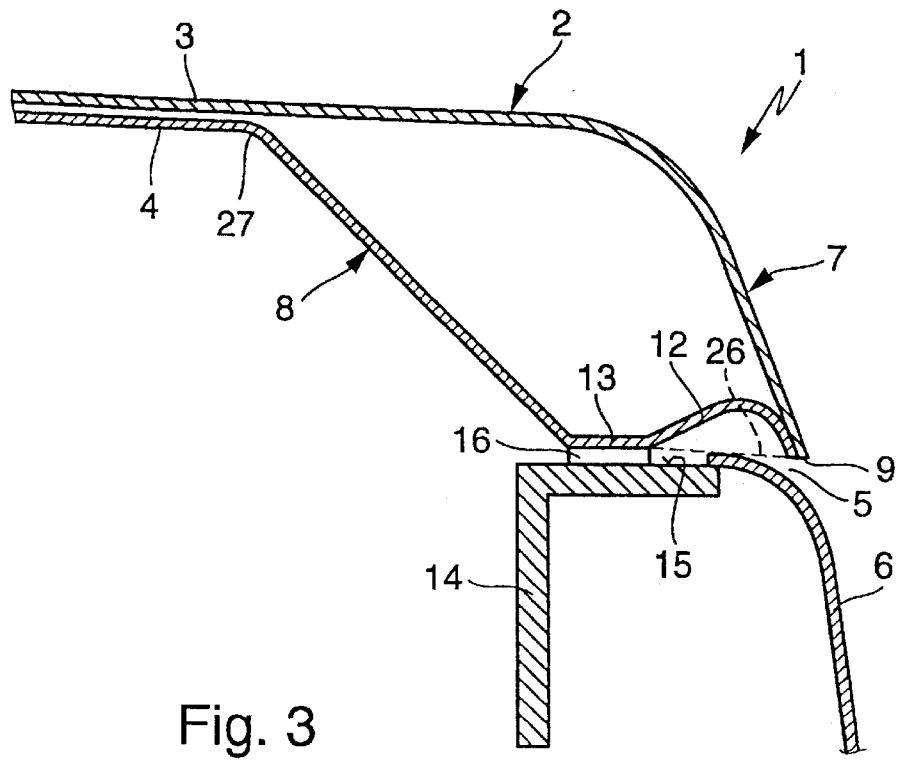
FIG. 3 is a sectional view similar to FIG. 1, but showing a third embodiment.
Figure 4:
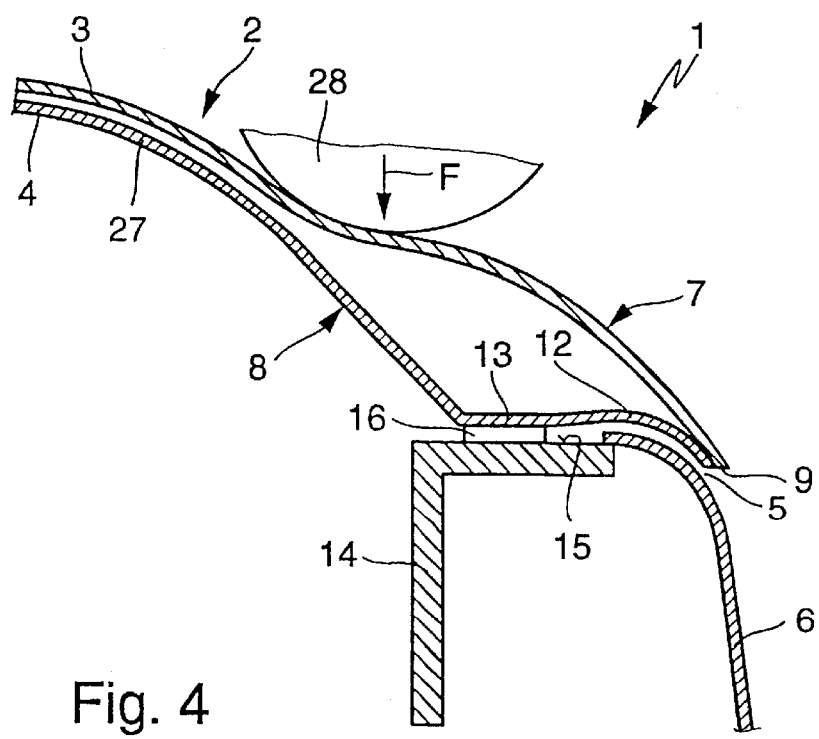
FIG. 4 is a sectional view as in FIG. 3, but shown during a vertical action of force.

In the case of another embodiment according to FIGS. 3 and 4, the at least one connecting web 12 can be fastened to the outer hood 3 in the region of the end edge 9. In the case of this particular embodiment, this connecting web 12 is formed in such a manner that it is longer in an initial state, which is reproduced in FIG. 3, than a rectilinear connecting line 26 which is plotted with a dashed line in FIG. 3 and runs through the stiffening zone 13 and through the end edge 9. In the case of the embodiment shown here, the connecting web 12 has a profile which is curved upwards with respect to this connecting line 26. In principle, however, other shapes for the connecting web 12 are also possible.

In the embodiment shown here, the border region 8 of the inner hood 4 exhibits a rectilinear profile between the stiffening zone 13 and an adjoining section of the inner hood 4. In this case, this rectilinear border region 8 of the inner hood 4 is designed such that it slopes downwards in an inclined manner towards the stiffening zone 13.

A transition region between the inner hood 4 and its border region 8 is formed here as a predetermined breaking point 27.

FIG. 4 illustrates a state in which a vertical force F acts on the front hood 2 in the border regions 7 and 8. This vertical force F is, for example, introduced into the front hood 2 through a body 28 which impacts from above onto the front hood 12 and only part of which is illustrated.

The border region 8 of the inner hood 4 is supported laterally outwards by the stop means 16, with the result that the energy of deformation acts more intensively on the outer hood 3. The deformation of the border region 7 of the outer hood 3 causes an outwardly directed expansion of this border region 7. Since the end edge 9 of this border region 7 is connected to the fixed stiffening zone 13 via the connecting web 12, the expansion of the border region 7 of the outer hood 3 causes this connecting web 12 to be deformed with the effect of elongating it. In this case, the predetermined shape of the connecting web 12 has the effect that when the border region 7 is expanded the end edge 9 carries out a downwardly directed movement in addition to the outwardly directed movement. To this extent, the end edge 9 remains relatively close to the mudguard 6, as a result of which a risk of injury in this region is reduced.

The predetermined breaking point 27 of the inner hood 4 enables the inner hood 4 and the outer hood 3 to be raised outside the border regions 7 and 8, as a result of which more impact energy can be absorbed in this impact variant.

Figure 5:
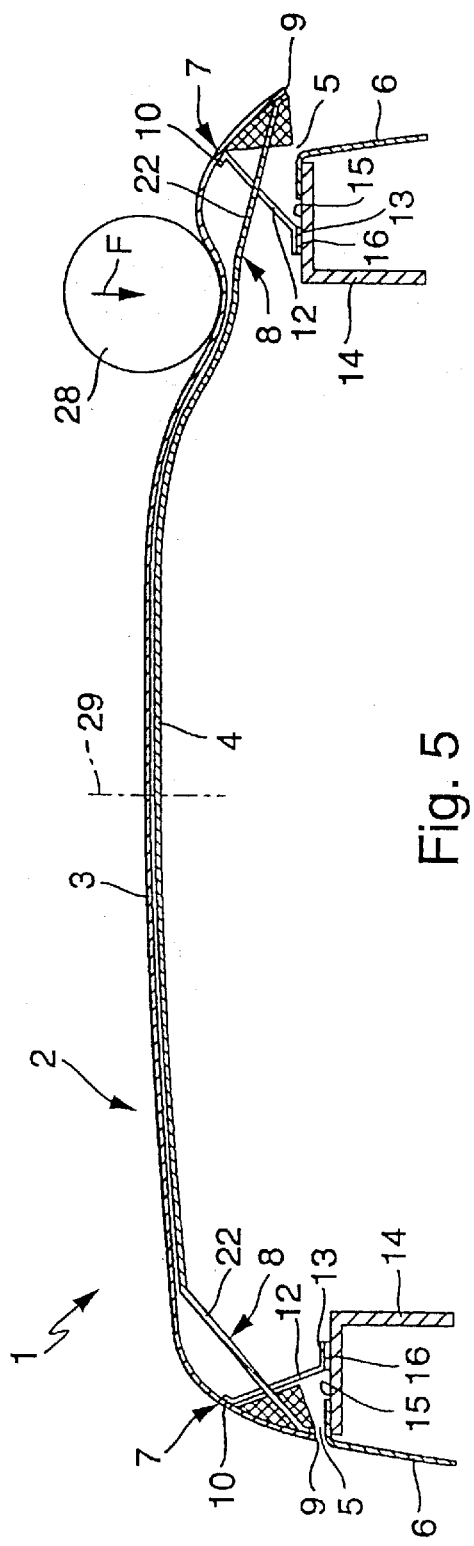
FIG. 5 is a sectional view through a front-hood arrangement in a fourth embodiment and with a laterally disposed vertical action of force.
Figure 6:
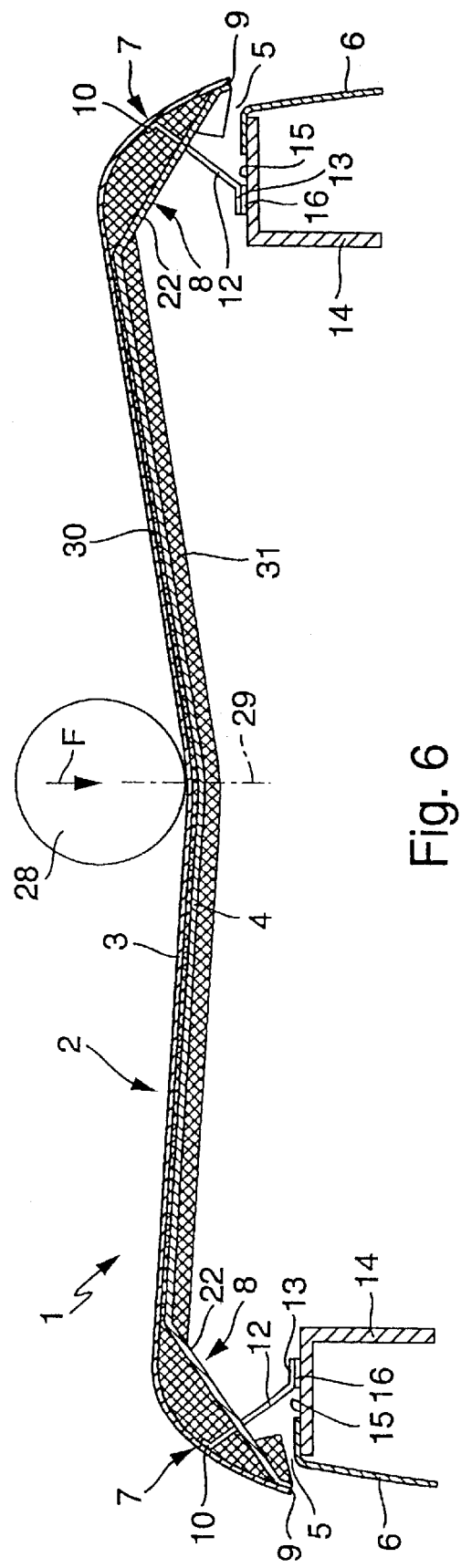
FIG. 6 is a view as in FIG. 5, but with a centrally disposed vertical action of force and in a refinement.

Whereas in the case of the embodiments of FIGS. 1 to 4, the at least one connecting web 12 is formed by a part of the border region 8 of the inner hood 4, in the case of the embodiments of FIGS. 5 and 6, the at least one connecting web 12 in each case forms a separate component which is independent, in particular, of the inner hood 4. These embodiments here constitute modifications of the embodiment according to FIG. 2, with the result that the border region 8 of the inner hood 4 has at least one transverse web 22 in each case.

In FIG. 5, a vertical action of force outside a center 29 of the front hood 2 is illustrated. The vertical force F, which impacts on the right-hand side according to FIG. 5, produces an expansion of the right border regions 7 and 8 of the outer hood 3 and of the inner hood 4, respectively. In the process, this expansion, in which the end edge 9 moves laterally outwards, is forcibly brought about by the connecting web 12, which is fixed to the supporting part 14, in conjunction with the transverse web 22, with the result that this movement behaviour of the front hood 2 can be ensured with great reliability for every impact. To this extent, the protective function of the front hood 2 with regard to people is increased.

In the case of the illustration according to FIG. 6, the vertical force F acts centrally on the front hood 2, with the result that both border regions 7, 8 of the front hood 2 are expanded essentially symmetrically.

In the case of the embodiment according to FIG. 6, a deadening material 30 is additionally arranged between the two hoods 3 and 4 in order to additionally dampen the impact. Moreover, a layer 31 of energy-absorbing material can be deposited on the inside of the inner hood 4 in order thereby to absorb the impact energy.

The stop means 16 are designed in such a manner that they permit the stiffening zone 13 to be lifted off when the front hood 2 is opened, and when the front hood 2 is closed, they come automatically into engagement with the stiffening zone 13 in order to be able to fulfil the desired lateral supporting function at least outwards, preferably outwards and inwards.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Front-hood arrangement for a passenger vehicle, having a downwardly facing, lateral separating gap, between a front hood and a mudguard, the front hood having an inner hood and an outer hood, the front hood having at least one stiffening zone which is supported directly or indirectly on a lateral supporting element of a vehicle body when the front hood is closed, the outer hood having a lateral border region, an end edge of which is adjacent to the separating gap, at least one connecting web being provided via which the stiffening zone is connected to the border region of the outer hood, wherein when the front hood is closed, the stiffening zone is supported laterally outwards on stop means which are fastened to the supporting element of the vehicle body.

2. Front-hood arrangement according to claim 1, wherein a plurality of connecting webs which are spaced apart from one another in a longitudinal direction of the vehicle are provided via which the stiffening zone is connected to the border region of the outer hood.

3. Front-hood arrangement according to claim 1, wherein the at least one connecting web is formed on a border region of the inner hood, which border region is adjacent to the separating gap.

4. Front-hood arrangement according to claim 2, wherein the at least one connecting web is formed on a border region of the inner hood, which border region is adjacent to the separating gap.

5. Front-hood arrangement according to claim 1, wherein the at least one connecting web is designed as a component which is independent of the inner hood.

6. Front-hood arrangement according to claim 2, wherein the at least one connecting web is designed as a component which is independent of the inner hood.

7. Front-hood arrangement according to claim 1, wherein the at least one connecting web is connected to the border region of the outer hood at a connection point which is remote from the separating gap, the stop means being arranged on a side of a vertical plane running in a longitudinal direction of the vehicle and through this connection point, which side faces away from the end edge of the border region of the outer hood, the at least one connecting web having a predetermined breaking point in the region of this connection point.

8. Front-hood arrangement according to claim 7, wherein the at least one connecting web extends essentially rectilinearly between the connection point and stiffening zone.

9. Front-hood arrangement according to claim 7, wherein the at least one connecting web is inclined with respect to the vertical plane.

10. Front-hood arrangement according to claim 8, wherein the at least one connecting web is inclined with respect to the vertical plane.

11. Front-hood arrangement according to claim 7, wherein a filling element made of an energy-absorbing material is attached to at least one of the at least one connecting web and the border region of the outer hood between the connection point which connects the at least one connecting web to the border region of the outer hood and the separating gap, said filling element at least partially filling a cavity which is formed below the connection point between the at least one connecting web and the border region of the outer hood.

12. Front-hood arrangement according to claim 8, wherein a filling element made of an energy-absorbing material is attached to at least one of the at least one connecting web and the border region of the outer hood between the connection point which connects the at least one connecting web to the border region of the outer hood and the separating gap, said filling element at least partially filling a cavity which is formed below the connection point between the at least one connecting web and the border region of the outer hood.

13. Front-hood arrangement according to claim 9, wherein a filling element made of an energy-absorbing material is attached to at least one of the at least one connecting web and the border region of the outer hood between the connection point which connects the at least one connecting web to the border region of the outer hood and the separating gap, said filling element at least partially filling a cavity which is formed below the connection point between the at least one connecting web and the border region of the outer hood.

14. Front-hood arrangement according to claim 2, wherein the at least one connecting web is connected to the border region of the outer hood at a connection point which is remote from the separating gap, the stop means being arranged on a side of a vertical plane running in a longitudinal direction of the vehicle and through this connection point, which side faces away from the end edge of the border region of the outer hood, the at least one connecting web having a predetermined breaking point in the region of this connection point.

15. Front-hood arrangement at least according to claim 2, wherein the border region of the inner hood has at least one transverse web which extends between two connecting webs, said transverse web being fastened by a lower end to the border region of the outer hood, in the region of its end edge, and outside the border region of the outer hood, said transverse web emerges with its upper end from the inner hood.

16. Front-hood arrangement at least according to claim 7, wherein the border region of the inner hood has at least one transverse web which extends between two connecting webs, said transverse web being fastened by a lower end to the border region of the outer hood, in the region of its end edge, and outside the border region of the outer hood, said transverse web emerges with its upper end from the inner hood.

17. Front-hood arrangement according to claim 15, wherein the inner hood is connected to the outer hood in the region of the upper end of the at least one transverse web.

18. Front-hood arrangement according to claim 16, wherein the inner hood is connected to the outer hood in the region of the upper end of the at least one transverse web.

19. Front-hood arrangement according to claim 15, wherein a transition between the upper end of the at least one transverse web and the inner hood is designed as a predetermined breaking point.

20. Front-hood arrangement according to claim 16, wherein a transition between the upper end of the at least one transverse web and the inner hood is designed as a predetermined breaking point.

21. Front-hood arrangement according to claim 17, wherein a transition between the upper end of the at least one transverse web and the inner hood is designed as a predetermined breaking point.

22. Front-hood arrangement according to claim 15, wherein the at least one transverse web extends essentially rectilinearly between its ends.

23. Front-hood arrangement according to claim 17, wherein the at least one transverse web extends essentially rectilinearly between its ends.

24. Front-hood arrangement according to claim 19, wherein the at least one transverse web extends essentially rectilinearly between its ends.

25. Front-hood arrangement according to claim 1, wherein the at least one connecting web is fastened to the border region of the outer hood, in the region of its end edge, the at least one connecting web between the stiffening zone and the end edge being of longer design in an initial state than a straight connecting line running through the connecting zone and the end edge.

26. Front-hood arrangement according to claim 25, wherein the at least one connecting web has a profile which is curved upwards with respect to the connecting line.

27. Front-hood arrangement according to claim 25, wherein the stiffening zone is formed on a border region of the inner hood, which border region is adjacent to the separating gap, and wherein the border region of the inner hood has a rectilinear profile between the connecting zone and an adjoining section of the inner hood, the border region rising inwards in an inclined manner from the connecting zone.

28. Front-hood arrangement according to claim 26, wherein the stiffening zone is formed on a border region of the inner hood, which border region is adjacent to the separating gap, and wherein the border region of the inner hood has a rectilinear profile between the connecting zone and an adjoining section of the inner hood, the border region rising inwards in an inclined manner from the connecting zone.

29. Front-hood arrangement according to claim 27, wherein a transition region between the inner hood and its border region is designed as a predetermined breaking point.

30. Front-hood arrangement according to claim 28, wherein a transition region between the inner hood and its border region is designed as a predetermined breaking point.

31. A vehicle assembly comprising:
    a mudguard extending along a vehicle side;
    a hood assembly including an inner hood and an outer hood operable to cover a space adjacent the vehicle side, said outer hood including a lateral border section which exhibits a bottom edge spaced by a separating gap from a top of the mudguard when the hood assembly is in a closed position,
    a vehicle body supporting element disposed laterally inward with respect to the mudguard,
    hood stiffening structure supported at the vehicle body supporting element when the hood assembly is in a closed position, and
    at least one connecting web connecting the hood stiffening structure with the lateral border section, wherein said hood stiffening structure and connecting web are configured such that the outer hood lateral border region is deformed and expanded laterally outwards in response to impact forces on top of the outer hood to thereby ensure a reliable deformation energy damping path in the event of pedestrian impact against the lateral border section.

32. A vehicle assembly according to claim 31, wherein respective predetermined breaking points are provided for the respective connecting webs.

33. A vehicle assembly according to claim 31, wherein said hood assembly is a front vehicle hood.

\* \* \* \* \*